United States Patent
Schaffer et al.

(10) Patent No.: US 11,324,154 B2
(45) Date of Patent: May 10, 2022

(54) OSCILLATION DAMPING FEATURES FOR A FINISHING ASSEMBLY OF AN AGRICULTURAL IMPLEMENT

(71) Applicant: CNH Industrial America LLC, New Holland, PA (US)

(72) Inventors: Jared Paul Schaffer, Normal, IL (US); Timothy R. Blunier, Danvers, IL (US); Brice Magarity, Deer Creek, IL (US)

(73) Assignee: CNH Industrial America LLC, New Holland, PA (US)

(*) Notice: Subject to any disclaimer, the term of this patent is extended or adjusted under 35 U.S.C. 154(b) by 347 days.

(21) Appl. No.: 16/437,073

(22) Filed: Jun. 11, 2019

(65) Prior Publication Data
US 2020/0390020 A1    Dec. 17, 2020

(51) Int. Cl.
*A01B 61/04* (2006.01)
*A01B 29/04* (2006.01)

(52) U.S. Cl.
CPC .......... *A01B 61/046* (2013.01); *A01B 29/048* (2013.01)

(58) Field of Classification Search
CPC ........ A01B 1/046; A01B 29/048; A01B 29/06
USPC ................................................. 172/265–269
See application file for complete search history.

(56) References Cited

U.S. PATENT DOCUMENTS

| | | | |
|---|---|---|---|
| 1,611,358 A * | 12/1926 | Miller | A01B 23/046 172/594 |
| 4,091,878 A | 5/1978 | Steketee | |
| 4,489,789 A | 12/1984 | Pearce | |
| 4,548,277 A * | 10/1985 | Dietrich, Sr. et al. | A01B 61/046 172/265 |
| 6,554,078 B1 | 4/2003 | McDonald | |
| 7,987,917 B1 | 8/2011 | Kornecki | |
| 8,534,373 B2 | 9/2013 | Van Buskirk et al. | |
| 9,247,687 B2 | 2/2016 | Gray et al. | |
| 9,615,500 B2 | 4/2017 | Sudbrink et al. | |
| 9,635,797 B2 | 5/2017 | Kovach et al. | |
| 10,021,821 B2 * | 7/2018 | Hennes | A01B 61/046 |
| 10,231,373 B2 | 3/2019 | Casper et al. | |
| 2008/0066935 A1 * | 3/2008 | Becker et al. | A01B 63/32 172/13 |
| 2009/0065222 A1 * | 3/2009 | Steinlage et al. | A01B 33/021 172/184 |
| 2013/0199807 A1 | 8/2013 | Hoffman et al. | |

(Continued)

OTHER PUBLICATIONS

Remlinger Mounted Harrows—Double Roller, Remlinger ISO9001:2015 Certified, dated Mar. 27, 2019, (3 pages), http://www.remlingermfg.com/dougle_roller.htm.

(Continued)

*Primary Examiner* — Tara Mayo-Pinnock
(74) *Attorney, Agent, or Firm* — Rebecca L. Henkel; Rickard K. DeMille

(57) ABSTRACT

In one aspect, a finishing assembly for an agricultural implement may include first and second rolling baskets, a basket support assembly configured to support the first and second rolling baskets relative to each other, a linkage pivotably coupled to the basket support assembly at a pivot point, and at least one damping element. The at least one damping element may be configured to damp pivoting of the basket support assembly about the pivot point in both a first pivot direction and a second pivot direction, the second pivot direction being opposite the first pivot direction.

20 Claims, 5 Drawing Sheets

(56) References Cited

U.S. PATENT DOCUMENTS

| | | | |
|---|---|---|---|
| 2014/0251646 A1* | 9/2014 | Gray et al. | A01B 29/048 172/1 |
| 2015/0020718 A1 | 1/2015 | Pitonyak | |
| 2015/0053437 A1* | 2/2015 | Kovach et al. | A01B 29/048 172/149 |
| 2015/0129264 A1* | 5/2015 | Sudbrink et al. | A01B 49/027 172/668 |
| 2015/0156962 A1* | 6/2015 | Zemenchik et al. | A01B 63/32 172/1 |
| 2018/0042164 A1 | 2/2018 | Blunier | |
| 2018/0206386 A1 | 7/2018 | Bell et al. | |
| 2018/0206388 A1 | 7/2018 | Blunier et al. | |
| 2019/0000002 A1 | 1/2019 | Steinlage et al. | |

OTHER PUBLICATIONS

Rolling Harrow Soil Conditioner, UM Unverferth, dated Mar. 27, 2019, (3 pages), http://www.umequip.com/tillage/seedbed/rolling-harrow/.

Model 8800 OnePass Soil Conditioner, Sterling Farm Supply, dated Mar. 27, 2019, (2 pages), http://www.sterlingfarmsupply.com/8800.html.

\* cited by examiner

OSCILLATION DAMPING FEATURES FOR A FINISHING ASSEMBLY OF AN AGRICULTURAL IMPLEMENT

FIELD OF THE INVENTION

The present disclosure relates generally to finishing assemblies for agricultural implements and, more particularly, to features for damping oscillations of a finishing assembly of an agricultural implement.

BACKGROUND OF THE INVENTION

It is well known that to attain the best agricultural performance from a piece of land, a farmer must cultivate the soil, typically through a tillage operation. Common tillage operations include plowing, harrowing, and subsoiling. Farmers perform these tillage operations by pulling a tillage implement behind an agricultural work vehicle, such as a tractor. Depending on the crop selection and the soil conditions, a farmer may need to perform several tillage operations at different times over a crop cycle to properly cultivate the land to suit the crop choice.

Modern farm practices demand a smooth, level field with small clods of soil in the fall and spring of the year. In this regard, residue must be cut, sized, and mixed with soil to encourage the residue to decompose and not build up following subsequent passes of machinery. To achieve such soil conditions, it is known to utilize rolling baskets, such as crumbler reels, to produce smaller, more uniform clod sizes and to aid in the mixing of residue. In some instances, pairs of rolling baskets or "double-basket assemblies" are rigidly coupled to a portion of the implement frame to condition the field during each pass. However, in such instances, uneven pressure may be applied to the baskets of each double-basket assembly. To prevent such uneven pressure, the rolling baskets of each double-basket assembly are fixed relative to each other by a hanger that is pivotably coupled to a portion of the implement such that the rolling baskets are configured to pivot together relative to the frame of the implement to follow the ground contour with more even pressure on each basket. However, since the double-basket assembly is allowed to freely pivot, a harmonic oscillation effect may occur, which undesirably causes a "washboard" or bumpy finishing of the field.

Accordingly, an improved finishing assembly of an agricultural implement with oscillation damping features would be welcomed in the technology

BRIEF DESCRIPTION OF THE INVENTION

Aspects and advantages of the invention will be set forth in part in the following description, or may be obvious from the description, or may be learned through practice of the invention.

In one aspect, the present subject matter is directed to a finishing assembly for an agricultural implement. The finishing assembly includes first and second rolling baskets, a basket support assembly configured to support the first and second rolling baskets relative to each other, a linkage pivotably coupled to the basket support assembly at a pivot point, and at least one damping element. The at least one damping element is configured to damp pivoting of the basket support assembly about the pivot point in both a first pivot direction and a second pivot direction, where the second pivot direction is opposite the first pivot direction.

In another aspect, the present subject matter is directed to an agricultural implement having an implement frame, the implement frame including a frame member, and a finishing assembly configured to be coupled to the frame member. The finishing assembly includes first and second rolling baskets, a basket support assembly configured to support the first and second rolling baskets relative to each other, a mounting bracket fixedly coupled to the frame member, a linkage, and at least one damping element. The linkage extends lengthwise between a first end and a second end. The first end of the linkage is pivotably coupled to the mounting bracket and the second end of the linkage is pivotably coupled to the basket support assembly at a pivot point. The at least one damping element is configured to damp pivoting of the basket support assembly about the pivot point in both a first pivot direction and a second pivot direction, where the second pivot direction is opposite the first pivot direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
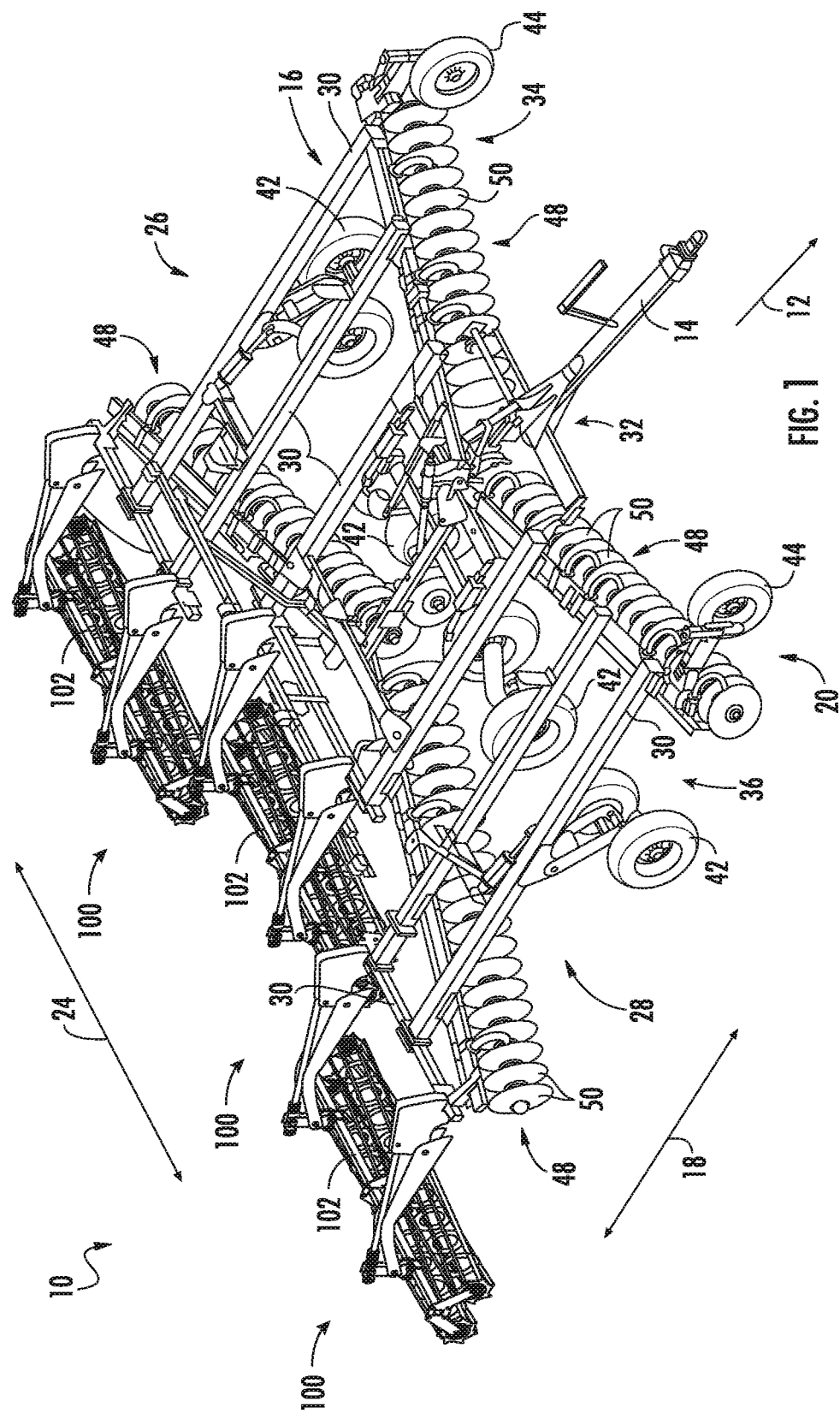
FIG. 1 illustrates a perspective view of one embodiment of an agricultural implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved finishing assembly for an agricultural implement that includes oscillation damping features. Specifically, in several embodiments, a finishing assembly is coupled to a portion of an agricultural implement at its aft end such that the finishing assembly can be utilized to make a smooth, level field with small clods of soil. For instance, the finishing assembly may include first and second rolling baskets configured to roll across a field to condition the soil within the field. The first and second rolling baskets may be supported relative to each other by a basket support assembly, with the basket support assembly being pivotably coupled to a linkage supported by the implement frame such that the rolling baskets pivot together with the basket support assembly about a pivot point defined between the assembly and the linkage to follow the contour of the field surface. The finishing assembly may additionally include at least one damping element configured to damp the pivoting or back-and-forth oscillations of the basket support assembly about the pivot point in both a first pivot direction and a second pivot direction, opposite the first pivot direction. By using the damping element(s), oscillations of the basket support assembly may be at least partially damped to provide enhanced performance of the associated finishing assembly.

Referring now to the drawings, FIG. 1 illustrates a perspective view of one embodiment of an agricultural implement 10 in accordance with aspects of the present subject matter. In general, the implement 10 may be configured to be towed along a forward direction of travel 12 by a work vehicle (not shown), such as a tractor or other agricultural work vehicle. For example, the work vehicle may be coupled to the implement 10 via a hitch assembly 14 or using any other suitable attachments means. As shown, the hitch assembly 14 may be coupled to a frame 16 of the implement 10 to facilitate towing the implement 10 in the direction of travel 12.

As shown, the frame 16 may extend in a longitudinal direction (e.g., as indicated by arrow 18 in FIG. 1) between a forward end 20 and an aft end 22. The frame 16 may also extend in a lateral direction (e.g., as indicated by arrow 24 in FIG. 1) between a first side 26 and a second side 28. In addition, the frame 16 may generally include a plurality of structural frame members 30, such as beams, bars, and/or the like, configured to support or couple to a plurality of components.

In several embodiments, the frame 16 may include one or more sections. For example, as shown, in the illustrated embodiment, the frame 16 may include a main or center section 32 positioned centrally between the first and second sides 26, 28 of the frame 16. The frame 16 may also include a first wing section 34 positioned adjacent to the first side 26 of the frame 16. Similarly, the frame 16 may also include a second wing section 36 positioned adjacent to the second side 28 of the frame 16. The first and second wing sections 34, 36 may be pivotably coupled to the main section 32 of the frame 16. In this respect, the first and second wing sections 34, 36 may be configured to fold up relative to the main section 32 to reduce the lateral width of the implement 10 to permit, for example, storage or transportation of the implement 10 on a road. However, in other embodiments, the frame 16 may include any suitable number of frame sections.

The implement 10 may further include various wheel assemblies coupled to the frame 16 to support the frame 16 relative to the ground and to facilitate towing the implement 10 in the direction of travel 12. Specifically, in several embodiments, the implement 10 may include a plurality of center support wheel assemblies 42 located centrally on the frame 16 between its forward and aft ends 20, 22, with the wheel assemblies 42 being spaced apart from one another in the lateral direction 24 of the implement 10 between its first and second sides 26, 28. In addition, the implement 10 may also include a plurality of forward support wheel assemblies 44 coupled to the frame 16 adjacent to the forward end 20 of the frame 16, with the wheel assemblies 44 being spaced apart from one another in the lateral direction 24 of the implement 10 between its first and second sides 26, 28. As shown in FIG. 1, the forward support wheel assemblies 44 may be spaced apart from the center support wheel assemblies 42 in the longitudinal direction 18 of the implement 10. It should be appreciated that the implement 10 may include any suitable number and/or type of wheel assemblies in alternate embodiments.

Referring still to FIG. 1, the implement 10 may also include a plurality of ground-engaging tools supported by the frame 16. For example, in several embodiments, the frame 16 may be configured to support one or more gangs or sets 48 of disc blades 50 at its forward end 20. In such embodiments, each disc blade 50 may, for example, include both a concave side (not shown) and a convex side (not shown). Furthermore, the gangs 48 of disc blades 50 may be oriented at an angle relative to the travel direction 12 to promote more effective tilling of the soil. Additionally, as shown, in one embodiment, the implement 10 may also include one or more finishing assemblies 10, wherein the frame 16 may be configured to support the finishing assemblies 100 adjacent to its aft end 20. As will be described below, each finishing assembly 100 may include a pair of rolling baskets 102, which may, in turn, be configured to reduce the number of clods in the soil and/or firm the soil over which the implement 10 travels.

Figure 2:
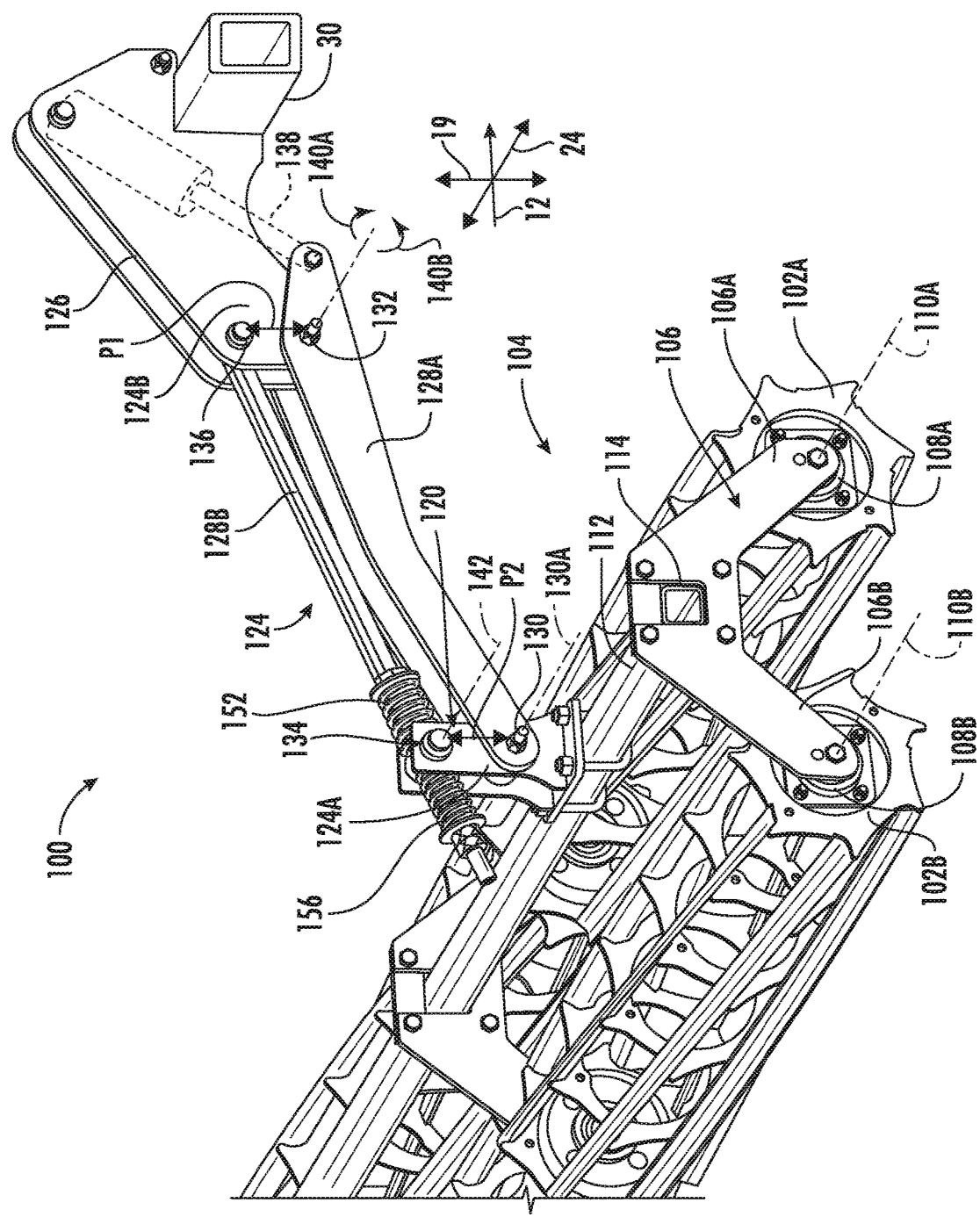
FIG. 2 illustrates a perspective view of one embodiment of a finishing assembly in accordance with aspects of the present subject matter.

It should be appreciated that, in addition to the gangs 48 of disc blades 50 and the rolling baskets 102 of the finishing assemblies 100 shown in FIGS. 1 and 2 (or as an alternative thereto), the implement 10 may include any other suitable ground-engaging tools. For instance, if the implement 10 is configured as a cultivator or ripper, the implement 10 may include a plurality shanks, harrow tines, leveling blades, and/or the like.

It should be appreciated that the configuration of the implement 10 described above and shown in FIG. 1 is provided only to place the present subject matter in an exemplary field of use. Thus, it should be appreciated that the present subject matter may be readily adaptable to any manner of implement configuration.

Figure 3:
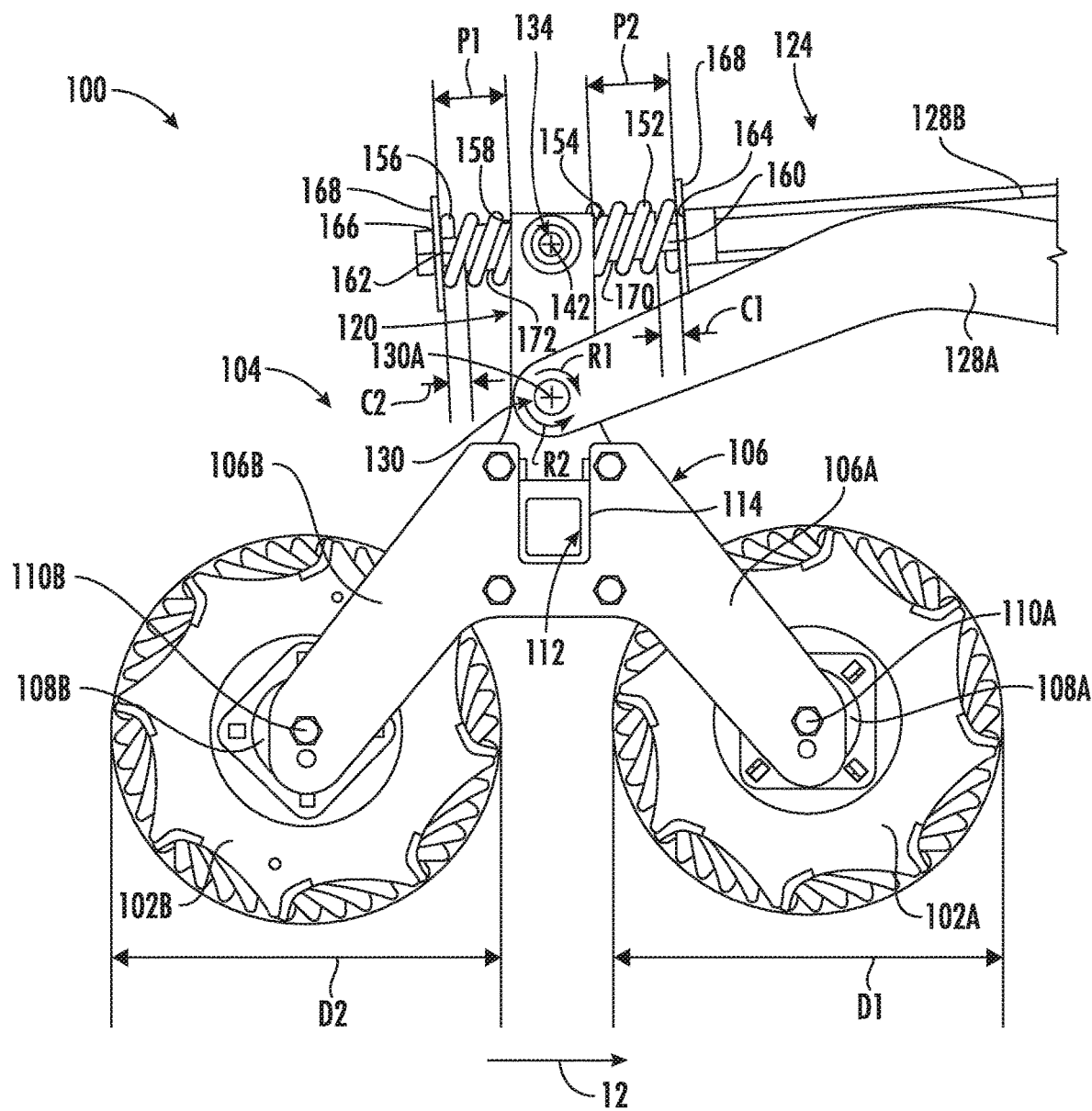
FIG. 3 illustrates a side view of a portion of the finishing assembly shown in FIG. 2 in accordance with aspects of the present subject matter.
Figure 4:
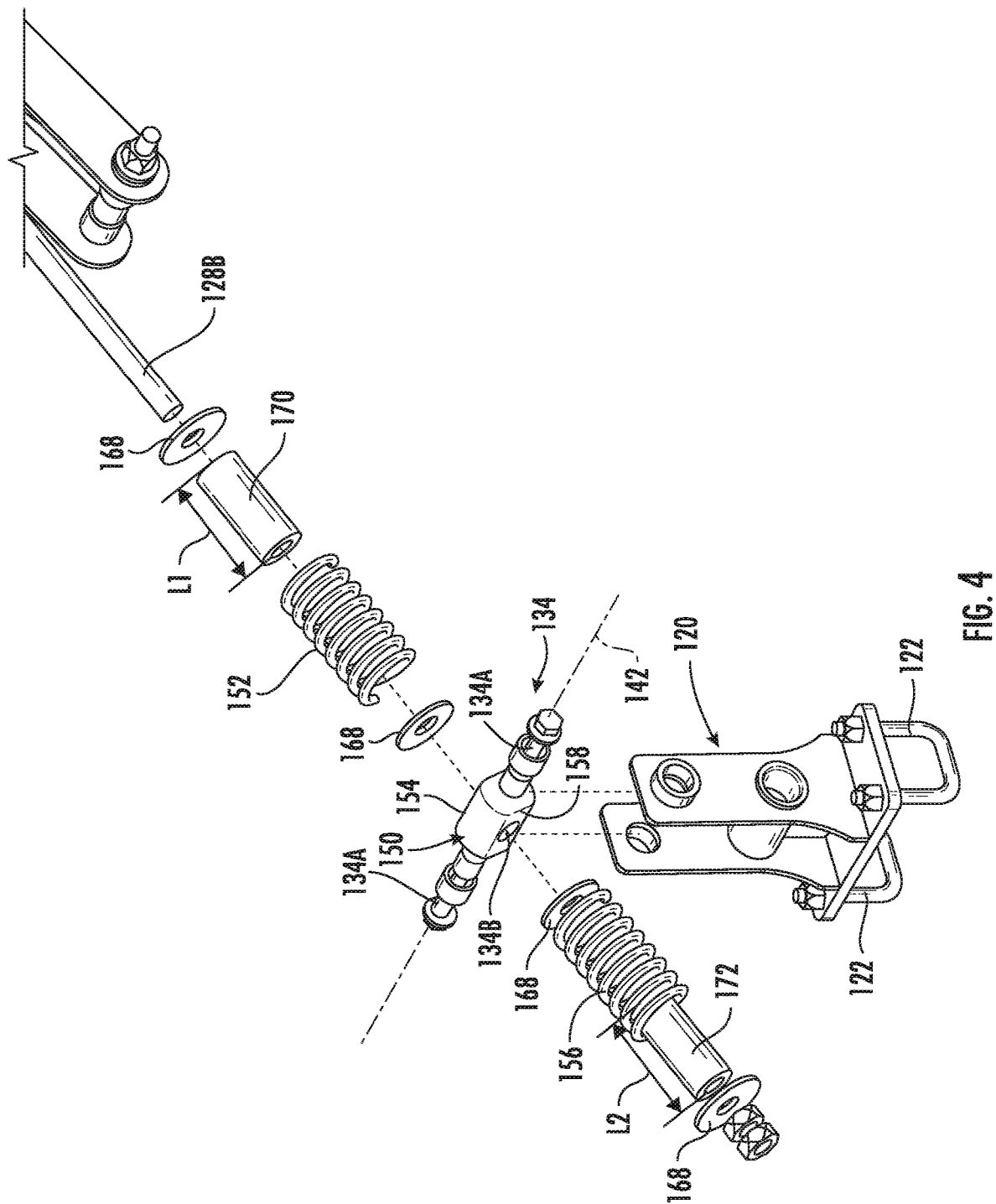
FIG. 4 illustrates a perspective view a portion of the finishing assembly shown in FIG. 2, particularly illustrating an exploded view of various components of the finishing assembly in accordance with aspects of the present subject matter.

Referring now to FIGS. 2-4, various views of one embodiment of a finishing assembly (e.g., the finishing assemblies 100 shown in FIG. 1) are illustrated in accordance with aspects of the present subject matter. Specifically, FIG. 2 illustrates a perspective view of one of the finishing assemblies 100 described above with reference to FIG. 1, while FIG. 3 illustrates a side view of a portion of the finishing assembly shown in FIG. 2. Additionally. FIG. 4 illustrates a perspective view of a portion of the finishing assembly shown in FIG. 3, particularly illustrating an exploded view of various components of the finishing assembly in accordance with aspects of the present subject matter. It should be appreciated that, for purposes of discussion, the finishing assembly 100 will be generally described with reference to the tillage implement 10 shown in FIG. 1. However, those of ordinary skill in the art will readily appreciate that the disclosed finishing assembly 100 may be utilized with any suitable agricultural implements having any other suitable implement configuration(s).

In general, the finishing assembly 100 includes a pair of the rolling baskets 102. For instance, as particularly shown in the illustrated embodiment, the finishing assembly 100 includes a first rolling basket 102A and a second rolling basket 102B. In general, the rolling baskets 102A, 102B may have any suitable configuration that allows the baskets to generally function as described herein. As shown in FIG. 3, the first rolling basket 102A has a first diameter D1 and the second rolling basket 102B has a second diameter D2. In some embodiments the diameters D1, D2 of the rolling baskets 102A, 102B are the same. Additionally, as shown in the illustrated embodiment, the rolling baskets 102A, 102B are shown as having the same configuration, such as by being of the same basket type, i.e., single, formed bar basket type. However, in other embodiments, the diameters D1, D2 of the rolling baskets 102A, 102B, the basket type of the rolling baskets 102A, 102B (e.g., a flat bar roller, or a round bar roller), or both the diameter D1, D2 and basket type may differ between the first and second rolling baskets 102A, 102B. For instance, in one embodiment, the first rolling basket 102A may have a smaller diameter than the second rolling basket 102B.

As shown in the illustrated embodiment, the finishing assembly 100 may further include a basket support assembly 104 configured to support the rolling baskets 102A, 102B relative to each other. The basket support assembly 104 may generally include one or more hangers 106 configured to support the rolling baskets 102 for rotation relative to the ground, such as by including a hanger 106 at each of the opposed ends of the baskets 102. For example, as shown in the illustrated embodiment, each hanger 106 has a forwardly extending arm 106A relative to the direction of travel 12 of the implement 10, and a rearwardly extending arm 106B relative to the direction of travel 12 of the implement 10. In such an embodiment, the forward-most basket (e.g., the first rolling basket 102A) may be rotatably coupled to the forwardly extending arm 106A of the hanger 106 by a first rotational coupling 108A (e.g., a bearing(s) and associated mounting structure) such that the rolling basket 102A is rotatable about a first rotational axis 110A. Similarly, the rearward-most basket (e.g., the second rolling basket 102B) may be rotatably coupled to the rearwardly extending arm 106B of the hanger 106 by a second rotational coupling 108B (e.g., a bearing(s) and associated mounting structure) such that the rolling basket 102B is rotatable about a second rotational axis 110B spaced apart from the first rotational axis 110A along the direction of travel 12 of the implement 10. Additionally, the forwardly and rearwardly extending arms 106A, 106B of the hanger 106 are fixed relative to each other such that the rolling baskets 102A, 102B are supported in a fixed relationship relative to each other. More particularly, the rolling baskets 102A, 102B are supported relative to each other via the hanger 106 such that the rotational axes 110A, 110B of the first and second rolling baskets 102A, 102B are fixed relative to each other.

In the illustrated embodiment, the basket support assembly 104 further includes a toolbar 112 configured to support one or more of the hangers 106. More particularly, the toolbar 112 may be rigidly coupled to the hangers 106 of the rolling baskets 102A, 102B to support each hanger 106 relative to the ground. For example, in the illustrated embodiment, the toolbar 112 extends along the lateral direction 24 and is received within or extends through an opening 114 defined by each of the hangers 106. In such an embodiment, the toolbar 112 may be coupled to each hanger 106 at or adjacent to the location at which the toolbar 112 is received within or extends through the associated opening 114. The toolbar 112 may, in some embodiments, support hangers 106 for more than one pair of rolling baskets 102.

Additionally, as shown in the illustrated embodiment, the basket support assembly 104 includes a pivot bracket 120 fixedly coupled to the toolbar 112. For example, in some embodiments, the pivot bracket 120 is fixedly coupled to the toolbar 112 by one or more clamp bolts 122 (FIG. 4), each of which is received around the toolbar 112 and fixed at its ends to the pivot bracket 120. It should be appreciated, however, that in other embodiments, the pivot bracket 120 may be fixedly coupled to the toolbar 112 by any other suitable attachment means, such as by coupling the pivot bracket 120 to the toolbar 112 via welding.

Generally, the pivot bracket 120 may function to pivotably couple the basket support assembly 104 to a corresponding linkage arrangement or assembly 124 of the finishing assembly 100. More particularly, as shown in FIG. 2, the linkage assembly 124 extends lengthwise between a first end 124A and a second end 124B. The first end 124A of the linkage assembly 124 is pivotably coupled to the pivot bracket 120 of the basket support assembly 104 and the second end 124B of the linkage assembly 124 is pivotably coupled to a mounting bracket 126 of the finishing assembly 100, with the mounting bracket 126 being fixedly coupled to a frame member 30 of the implement frame of the implement 10 (e.g., at the aft end of the implement 10).

As shown in the illustrated embodiments, the linkage assembly 124 includes both a first linkage 128A and a second linkage 128B. The first linkage 128A is pivotably coupled at the first end 124A of the linkage assembly 124 to the pivot bracket 120 at a pivot point 130, which defines a pivot axis 130A about which the basket support assembly 104 is configured to pivot relative to the linkage assembly 124. Specifically, as shown in FIG. 3, the basket support assembly 104 is pivotable in a first pivot direction R1 about the pivot axis 130A and in a second pivot direction R2 about the pivot axis 130A, with the second pivot direction R2 being opposite the first pivot direction R1. Additionally, as shown in the figures, given the configuration of the basket support assembly 104, the pivot point 130 is positioned higher than the first and second rolling baskets 102A, 102B in a vertical direction (e.g., as indicated by arrow 19 in FIG. 2). The first linkage 128A is further pivotably coupled at the second end 124B of the linkage assembly 124 to the mounting bracket 126 at a pivot point 132. Similarly, the second linkage 128B is coupled at the first end 124A of the linkage assembly 124 to the pivot bracket 120 at a pivot point 134, which defines a pivot axis 142 as will be described below in greater detail. The pivot point 134 is positioned higher than the pivot point 132 in the vertical direction 19, and opposite the toolbar 112. It should be appreciated that the pivot point 134 may be vertically aligned with the pivot point 132 along the vertical direction 19, as shown in FIG. 2, or may be offset from a vertical alignment with the pivot point 132, such as in the direction of travel 12. The second linkage 128B is further pivotably coupled at the second end 124B of the linkage assembly 124 to the mounting bracket 126 at a pivot point 136. As such, the pivot bracket 120 and the mounting bracket 126 together with the first and second linkages 128A, 128B form a four-bar linkage.

Additionally, as shown in FIG. 2, a downforce actuator 138 may be provided to supply downforce to the basket support assembly 104. The downforce actuator 138 may generally be coupled between the mounting bracket 126 and the first linkage 128A at the second end 124B of the linkage assembly 124, such as at a location forward of the pivot point 132 defined between the linkage 128A and the mounting bracket 126. In the illustrated embodiment, as a rod associated with downforce actuator 138 is extended, the first linkage 128A pivots about the pivot point 132 in a first rotational direction 140A, thereby raising the baskets relative to the ground. Conversely, as the rod associated with the downforce actuator 138 is retracted, the first linkage 128B pivots about the first pivot point 132 in a second rotational direction 140B (opposite the first rotational direction 140A), thereby lowering the baskets into contact with the ground to apply a desired downforce to the baskets.

As particularly shown in FIG. 2, the pivot points 132, 136 defined between the mounting bracket 126 and the first and second linkages 128A, 128B, respectively are spaced apart by a first distance P1 while the pivot points defined between the pivot bracket 120 and the first and second linkages 128A, 128B (e.g., between the pivot point 130 and the pivot point 134) are spaced apart by a second distance P2. In several embodiments, the first distance P1 may be greater than the second distance P2 such that the rearward rolling basket, e.g., the second rolling basket 102B, is slightly higher than the forward rolling basket, e.g., the first rolling basket 102A, when the downforce actuator 138 is actuated to raise the basket support assembly 104 relative to the ground, e.g., for transport.

As particularly shown in FIG. 4, the second linkage 128B is configured to be coupled to the pivot bracket 120 via a slide mount 150 positioned at the pivot point 134. In several embodiments, the slide mount 150 has a first mount portion 150A and a second mount portion 150B. The first mount portion 150A of the slide mount 150 is configured to be pivotably received within the pivot bracket 120 such that the slide mount 150 pivots about the pivot axis 142 relative to the pivot bracket 120. The second mount portion 150B defines an opening which slidably receives a portion of the second linkage 128B. As such, the slide mount 150 is configured to slide relative to the second linkage 128B while pivoting relative to the pivot bracket 120 to allow the pivot bracket 120 to maintain its ability to pivot about the pivot axis 130A (FIG. 2) defined at the pivot point 130 between the bracket 120 and the first linkage 128A.

In accordance with aspects of the present subject matter, to allow oscillations of the basket support assembly 104 to be at least partially damped during operation of the implement 10, the finishing assembly 100 further includes at least one damping element provided in operative association with the basket support assembly 104. More particularly, in several embodiments, the damping element(s) is configured to act on or engage the slide mount 150 to damp pivoting of the basket support assembly 104 about the pivot point 130 in both the first pivot direction R1 and the second pivot direction R2 while permitting relative movement between the slide mount 150 and the second linkage 128B.

For example, when one of the baskets (e.g., the first basket 102A) encounters rocks or other impediments in the field, the basket support assembly 104 is urged to pivot about the pivot axis 130A in the second pivot direction R2. In such instance, the damping element(s) may be configured to damp such pivotal motion by slowing or resisting the sliding of the slide mount 150 along the second linkage 128B in the direction of the first end 124A of the linkage assembly 124. Similarly, when one of the baskets (e.g., the first basket 102A) encounters a drop in the field, the basket support assembly 104 will tend to pivot about the pivot axis 130A in the first pivot direction R1. In such instance, the damping element(s) may be configured to damp such pivotal motion by slowing or resisting the sliding of the slide mount 150 on the second linkage 128B in the direction of the second end 124B of the linkage assembly 124. As such, the damping element(s) allows the rolling baskets 102A, 102B to work the ground more evenly when encountering changes in the field and to experience less oscillation for a shorter amount of time, which results in a smoother field surface. Additionally, the damping element(s) "cushions" the impact caused by larger impediments or divots, which may be used to protect various elements of the finishing assembly 100.

In one embodiment, the damping element(s) includes a first spring 152 configured to engage a first side 154 of the slide mount 150 and a second spring 156 configured to engage a second side 158 of the slide mount 150, opposite the first side 154 of the slide mount 150. More particularly, the springs 152, 156 may be received on the second linkage 128B such that a first portion 160 (FIG. 3) of the second linkage 128B extends through the first spring 152 and a second portion 162 (FIG. 3) of the second linkage 128B extends through the second spring 156, with the first and second portions 160, 162 of the second linkage 128B being generally separated by the slide mount 150. In such an embodiment, the first spring 152 is configured to be compressed when damping pivoting of the basket support assembly 104 in the first pivot direction R1, while the second spring 156 is configured to be compressed when damping pivoting of the basket support assembly 104 in the second pivot direction R2.

As shown in FIG. 3, the springs 152, 156 are configured to transmit force from the slide mount 150 to the second linkage 128B at respective first and second bearing surfaces 164, 166 of the second linkage 128B. In some embodiments, the force transmission may be indirect. For example, as the slide mount 150 presses against the springs 152, 156, the springs 152, 156 may be configured to press bearing plates or washers 168 against the bearing surfaces 164, 166. In some instances, additional washers 168 may be positioned between the slide mount 150 and the springs 152, 156. In other embodiments, however, the springs 152, 156 may be configured to directly transmit forces to the bearing surfaces 164, 166 of the second linkage 128B without any intermediate elements.

In some embodiments, the compression of the springs 152, 156 may be limited by limiting elements or features associated with the damping elements. More particularly, as shown in FIG. 4, a first travel limiter 170 may be received on the first portion 160 of the second linkage 128B and extend through the first spring 152, while a second travel limiter 172, may be received on the second portion 162 of the second linkage 128B and extend through the second spring 154. Specifically, in the illustrated embodiment, each travel limiter 170, 172 is trapped or retained along the second linkage 126B between the slide mount 150 (or associated washer 168) and the respective bearing surface 164, 166 (or associated washer 168). Additionally, as shown in FIG. 4, the first travel limiter 170 has a first length L1 and the second travel limiter 172 has a second length L2, with the length L1, L2 of each travel limiter 170, 172 generally extending lengthwise along the respective first and second portions 160, 162 of the second linkage 128B. In one embodiment, the length L1, L2 of each travel limiter 170, 172 is configured to be less that the length P1, P2 (FIG. 3) of the respective first or second portion 160, 162 of the second linkage 128B. As such, each travel limiter 170, 172 may limit movement of the slide mount 150 along the second linkage 128B to a maximum distance C1, C2, with the maximum distance C1, C2 being equal to the difference between the length L1, L2 of the travel limiter 170, 172 and the length P1, P2 of the respective first or second portion 160, 162 of the second linkage 128B. Accordingly, the travel limiters 170, 172 function to limit the amount of pivoting of the basket support assembly 104 about the pivot axis 130A.

It should be appreciated that the damping element(s) may be configured as any other suitable type of damping element, or any suitable combination of damping element types that allows the pivoting of the basket support assembly 104 about the pivot point 130 to be damped in both the first pivot direction R1 and the second pivot direction R2. For example, in one embodiment, the damping element(s) may be configured as one or more dashpot dampers, one or more shock absorbers, one or more sections of compressible material, and/or the like.

It should also be appreciated that the damping element(s) may include any number of damping elements. For example, while not shown, the damping element(s) may simply correspond to a single damping element configured to damp pivoting in both the first and second pivot directions R1, R2. Alternatively, three or more damping elements may be utilized, with multiple damping elements being configured to damp pivoting in at least one of the first or second pivot directions R1, R2.

Figure 5:
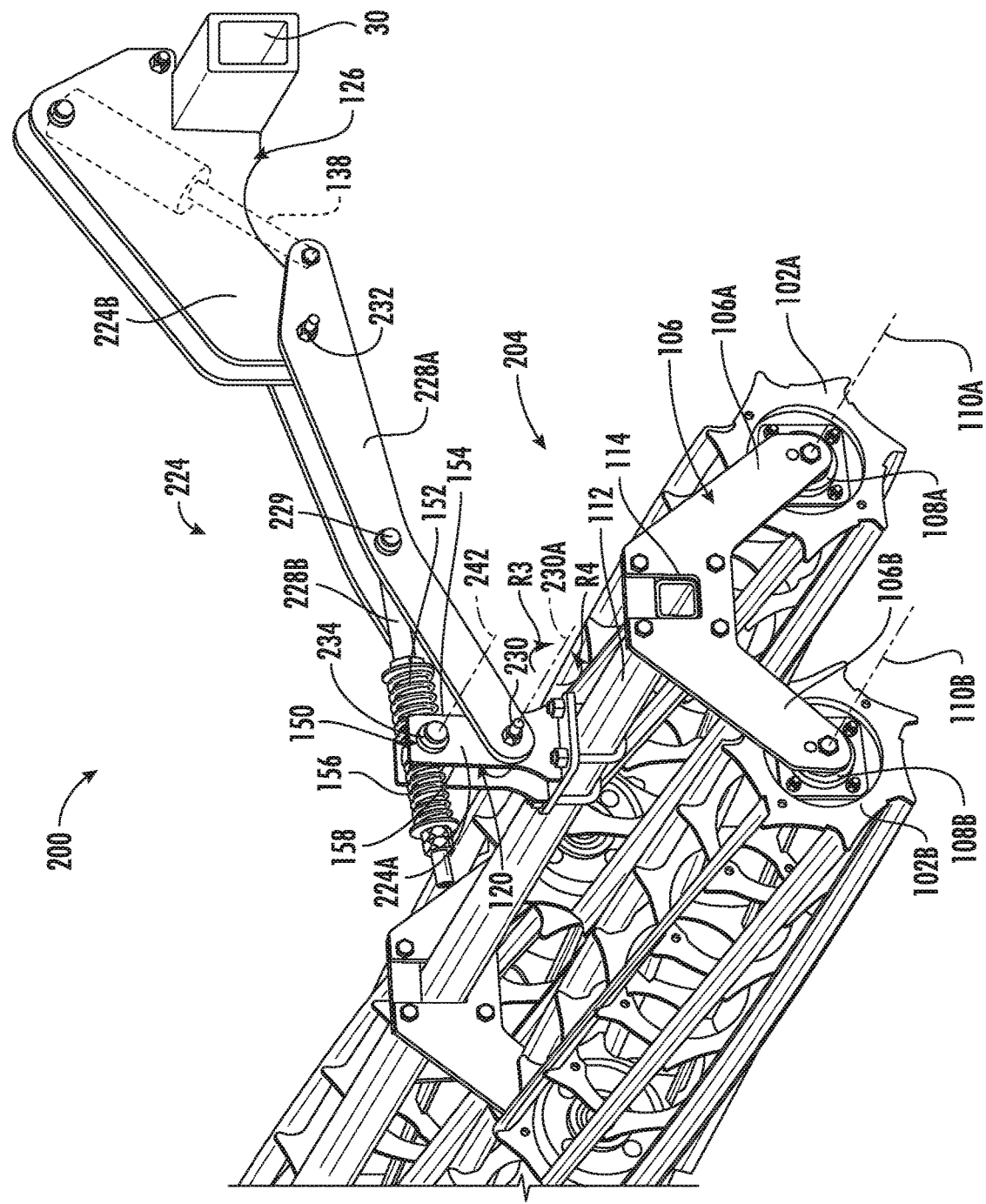
FIG. 5 illustrates a perspective view of another embodiment of a finishing assembly in accordance with aspects of the present subject matter.

Referring now to FIG. 5, another embodiment of a finishing assembly is illustrated in accordance with aspects of the present subject matter. It should be appreciated that, for purposes of discussion, the finishing assembly 200 will be generally described with reference to the tillage implement 10 shown in FIG. 1. However, those of ordinary skill in the art will readily appreciate that the disclosed finishing assembly 200 may be utilized with any suitable agricultural implements having any other suitable implement configuration(s).

In the embodiment illustrated in FIG. 5, the finishing assembly 200 is generally configured the same as or similar to the finishing assembly 100 described above with reference to FIGS. 2-4. However, unlike the four-bar linkage assembly 124 of the finishing assembly 100 of FIGS. 2-4, the linkage assembly 224 of the finishing assembly 200 only has one linkage coupled between the pivot bracket 120 and the mounting bracket 126. More particularly, the linkage assembly 224 extends lengthwise between a first end 224A and a second end 224B. The first end 224A of the linkage assembly 224 is pivotably coupled to the pivot bracket 120 of the basket support assembly 104 and the second end 224B of the linkage assembly 224 is pivotably coupled to the mounting bracket 126 of the finishing assembly 200, with the mounting bracket 126 being fixedly coupled to the frame member 30 of the implement frame of the implement 10 (e.g., at the aft end of the implement 10).

As shown in the illustrated embodiment, the linkage assembly 224 includes a first linkage 228A configured the same as or substantially similar to the first linkage 128A described above with reference to FIGS. 2-4. For instance, the first linkage 228A is pivotably coupled to the pivot bracket 120 at a pivot point 230 defined at the first end 224A of the linkage assembly 224 such that the basket support assembly 104 is pivotable in a first pivot direction R3 about a pivot axis 230A defined by the pivot point 230 and in a second pivot direction R4 about the pivot axis 230A, opposite the first pivot direction R3. The first linkage 228A is further pivotably coupled to the mounting bracket 226 at the second end 224B of the linkage assembly 224 at a pivot point 232.

Additionally, as shown in the illustrated embodiment, the linkage assembly 224 includes a second linkage 228B. The second linkage 228B is pivotably coupled to the pivot bracket 120 at a pivot point 234, which defines a pivot axis 242. However, unlike the second linkage 128B of the embodiment shown in FIGS. 2-4, the second linkage 228B is pivotably coupled at its second end 229, towards the second end 224B of the linkage assembly 224, to the first linkage 228A, such as at a location between the first and second ends 224A, 224B of the linkage assembly 224.

As provided above, in accordance with aspects of the present subject matter, the finishing assembly 200 further includes at least one damping element provided in operative association with the basket support assembly 104 to allow oscillations of the basket support assembly 104 to be at least partially damped during operation of the implement 10. More particularly, in several embodiments, the damping element(s) is configured to act on or engage a slide mount 150 coupling the second linkage 228B to the pivot bracket 120 positioned at the pivot point 234 to damp pivoting of the basket support assembly 104 about the pivot point 230 in both the first pivot direction R3 and the second pivot direction R4 while permitting relative movement between the slide mount 150 and the second linkage 228B.

In one embodiment, the damping element(s) may be configured the same as the damping element(s) described above with reference to FIGS. 2-4. For example, in one embodiment, the damping element(s) includes the first spring 152 configured to engage the first side 154 of the slide mount 150 and the second spring 156 configured to engage the second side 158 of the slide mount 150, opposite the first side 154 of the slide mount 150.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A finishing assembly for an agticultural implement, comprising:
   first and second rolling baskets;
   a basket support assembly configured to support the first and second rolling baskets relative to each other, the basket support assembly comprising:
      a hanger configured to support the first and second rolling baskets for rotation relative to the ground:
      a toolbar fixedly coupled to the hanger; and
      a pivot bracket coupled to the toolbar;
   a linkage pivotably coupled to the pivot bracket of the basket support assembly at a pivot point; and
   at least one damping element configured to damp pivoting of the basket support assembly about the pivot point in both a first pivot direction and a second pivot direction, the second pivot direction being opposite the first pivot direction.

2. The finishing assembly of claim 1, wherein the at least one damping element is configured to apply a biasing force against the pivot bracket that damps pivoting of the basket support assembly about the pivot point in both the first pivot direction and the second pivot direction.

3. The finishing assembly of claim 2, wherein the linkage comprises a first linkage and a second linkage, the pivot bracket being coupled to the second linkage via a slide mount spaced apart from the pivot point.

4. The finishing assembly of claim 3, wherein the slide mount is slidably received on the second linkage, the at least one damping element configured to engage the slide mount.

5. The finishing assembly of claim 3, wherein the pivot bracket is coupled to the second linkage via the slide mount at a location above the pivot point in a vertical direction.

6. The finishing assembly of claim 3, wherein the at least one damping element includes a first spring positioned on a first side of slide mount and a second spring positioned on a second side of the slide mount, the first spring being configured to engage the slide mount along its first side to damp pivoting of the basket support assembly in the first pivot direction and the second spring being configured to engage the slide mount along its second side to damp pivoting of the basket support assembly in the second pivot direction.

7. The finishing assembly of claim 6, wherein a first portion of the second linkage extends through the first spring and a second portion of the second linkage extends through the second spring.

8. The finishing assembly of claim 3, further comprising a travel limiter positioned on the second linkage and configured to limit an amount of pivoting of the basket support assembly about the pivot point in one of the first pivot direction or the second pivot direction.

9. The finishing assembly of claim 3, further comprising a mounting bracket configured to be fixed to a frame member of the agricultural implement, wherein the first and second linkages are pivotably coupled between the mounting bracket and the pivot bracket such that the pivot bracket, the first linkage, the second linkage, and the mounting bracket form a four-bar linkage.

10. The finishing assembly of claim 9, further comprising a downforce actuator pivotably coupled between the first linkage and the mounting bracket.

11. The finishing assembly of claim 1, wherein the pivot point is defined at a location positioned above the first and second rolling baskets in a vertical direction.

12. The finishing assembly of claim 1, wherein the first rolling basket is of a different diameter and/or basket type from the second rolling basket.

13. The finishing assembly of claim 1, wherein the at least one damping element is between the pivot bracket and the linkage.

14. An agricultural implement, comprising:
an implement frame comprising a frame member; and
a finishing assembly configured to be coupled to the frame member, the finishing assembly comprising:
first and second rolling baskets;
a basket support assembly configured to support the first and second rolling baskets relative to each other, the basket support assembly comprising:
a hanger configured to support the first and second rolling baskets for rotation relative to the ground;
a toolbar fixedi coupled to the hanger; and.
a pivot bracket coupled to the toolbar;
a mounting bracket fixedly coupled to the frame member;
a linkage extending lengthwise between a first end and a second end, the first end being pivotably coupled to the mounting bracket and the second end being pivotably coupled to the pivot bracket of the basket support assembly at a pivot point; and
at least one damping element configured to damp pivoting of the basket support assembly about the pivot point in both a first pivot direction and a second pivot direction, the second pivot direction being opposite the first pivot direction.

15. The agricultural implement of claim 14, wherein the at least one damping element, is configured to apply a biasing force against the pivot bracket that damps pivoting of the basket support assembly about the pivot point in both the first pivot direction and the second pivot direction.

16. The agricultural implement of claim 15, wherein the linkage comprises a first linkage and a second linkage, the pivot bracket being coupled to the second linkage via a slide mount spaced apart from the pivot point.

17. The agricultural implement of claim 16, wherein the slide mount is slidably received on the second linkage, the at least one damping element configured to engage the slide mount.

18. The agricultural implement of claim 16, wherein the at least one damping element includes a first spring positioned on a first side of slide mount and a second spring positioned on a second side of the slide mount, the first spring being configured to engage the slide mount along its first side to damp pivoting of the basket support assembly in the first pivot direction and the second spring being configured to engage the slide mount along its second side to damp pivoting of the basket support assembly in the second pivot direction.

19. The agricultural implement of claim 14, wherein the pivot point is defined at a location positioned vertically above the first and second rolling baskets.

20. The agricultural implement of claim 14, wherein the at least one damping element is between the pivot bracket and the linkage.

* * * * *